(12) United States Patent
Soucy

(10) Patent No.: US 6,202,321 B1
(45) Date of Patent: Mar. 20, 2001

(54) DRYING APPARATUS FOR COFFEE BEANS AND SIMILAR CROPS

(76) Inventor: Paul B. Soucy, 119 West St., Methuen, MA (US) 01844-1190

( * ) Notice: Subject to any disclaimer, the term of this patent is extended or adjusted under 35 U.S.C. 154(b) by 0 days.

(21) Appl. No.: 09/021,360

(22) Filed: Feb. 10, 1998

Related U.S. Application Data

(60) Provisional application No. 60/043,364, filed on Apr. 2, 1997.

(51) Int. Cl.[7] .................................................. F26B 3/00
(52) U.S. Cl. ........................... 34/507; 34/512; 34/68; 34/93; 34/210; 126/629; 126/704
(58) Field of Search ............................. 34/507, 511, 512, 34/519, 68, 93, 205, 209, 210, 232; 126/620, 619, 629, 631, 646, 681, 428, 429, 431, 704

(56) References Cited

U.S. PATENT DOCUMENTS

| | | | |
|---|---|---|---|
| 278,199 | 5/1883 | Sweeny | 432/106 |
| 1,556,865 | 10/1925 | Müller | 34/418 |
| 4,045,880 | 9/1977 | Steffen | 34/93 |
| 4,099,338 | 7/1978 | Mullin | 34/514 |
| 4,122,828 * | 10/1978 | DiPeri | 126/270 |
| 4,263,721 | 4/1981 | Danford | 34/514 |
| 4,391,046 | 7/1983 | Pietraschke | 34/93 |
| 4,490,926 | 1/1985 | Stokes | 34/76 |
| 4,501,074 | 2/1985 | O'Hare | 34/93 |
| 5,001,846 | 3/1991 | Andrassy | 34/93 |
| 5,584,127 | 12/1996 | Sutherland | 34/93 |
| 5,960,560 * | 10/1999 | Stoll | 34/526 |

* cited by examiner

*Primary Examiner*—Pamela Wilson
(74) *Attorney, Agent, or Firm*—Vernon C. Maine; Scott J. Asmus

(57) ABSTRACT

The invention is a convective airflow dryer system for coffee beans and other such crops, that includes a removable materials container. The removable, stackable container has at least one interior airway structure extending from, preferably, the bottom or sidewall surface to about the top of the container. The airflow structure is configured to freely admit, flow and transfer air, including moisture ladened air, through a port or vent in the bottom or sidewall, over its length and breadth into and out of the coffee beans or other crops or materials being dried, and out the top of the container. The dryer system and the containers are configured for directing the full airflow of the dryer system through the container or set of interconnected containers when in place, and to easily remove the containers from the dryer for emptying, refilling and reuse.

20 Claims, 10 Drawing Sheets

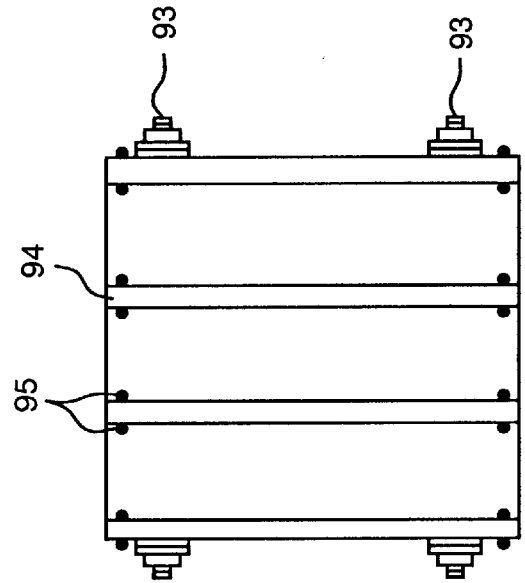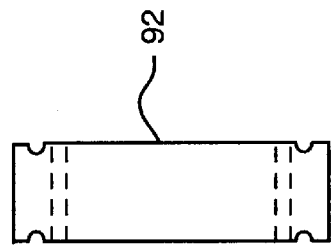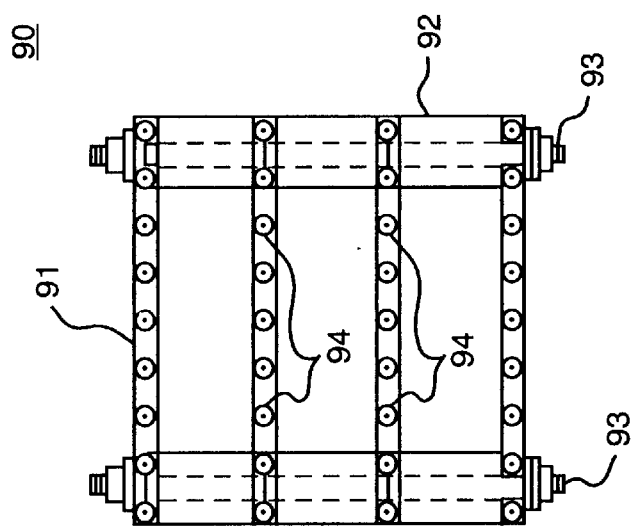

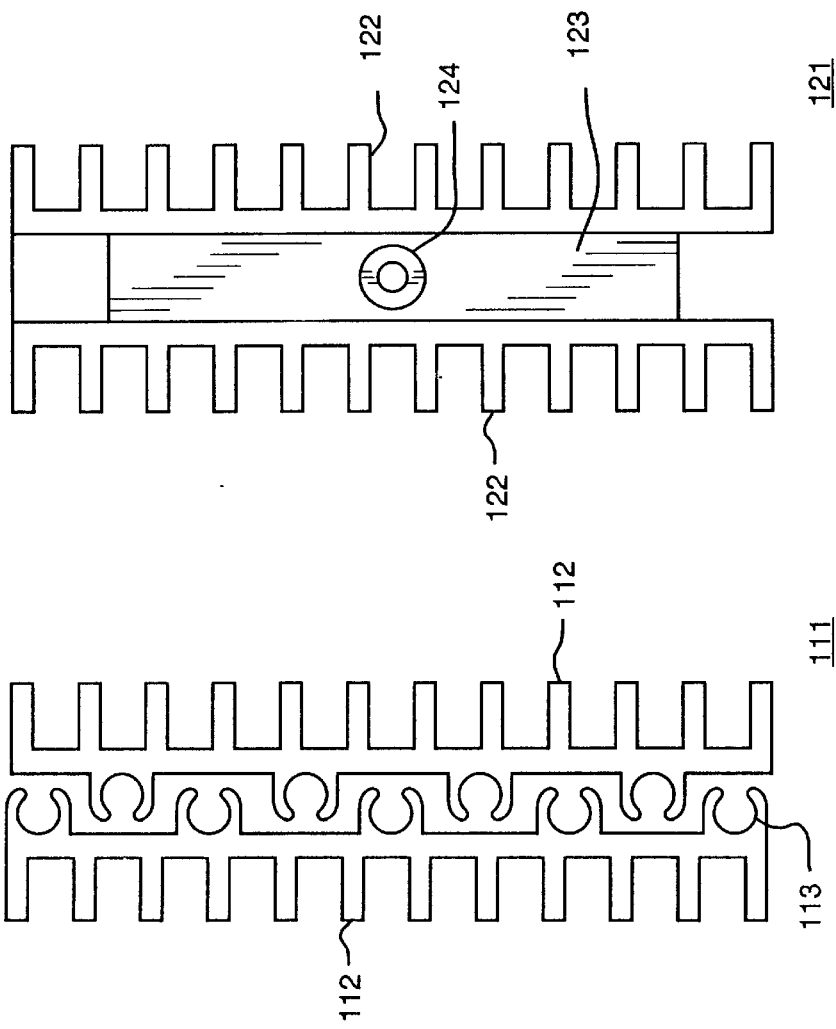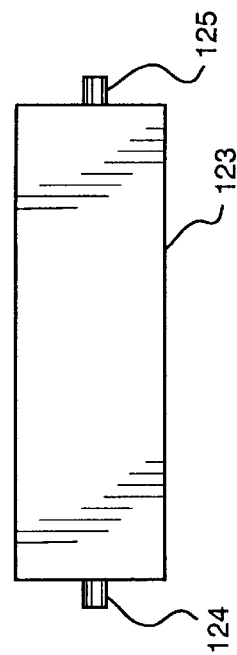

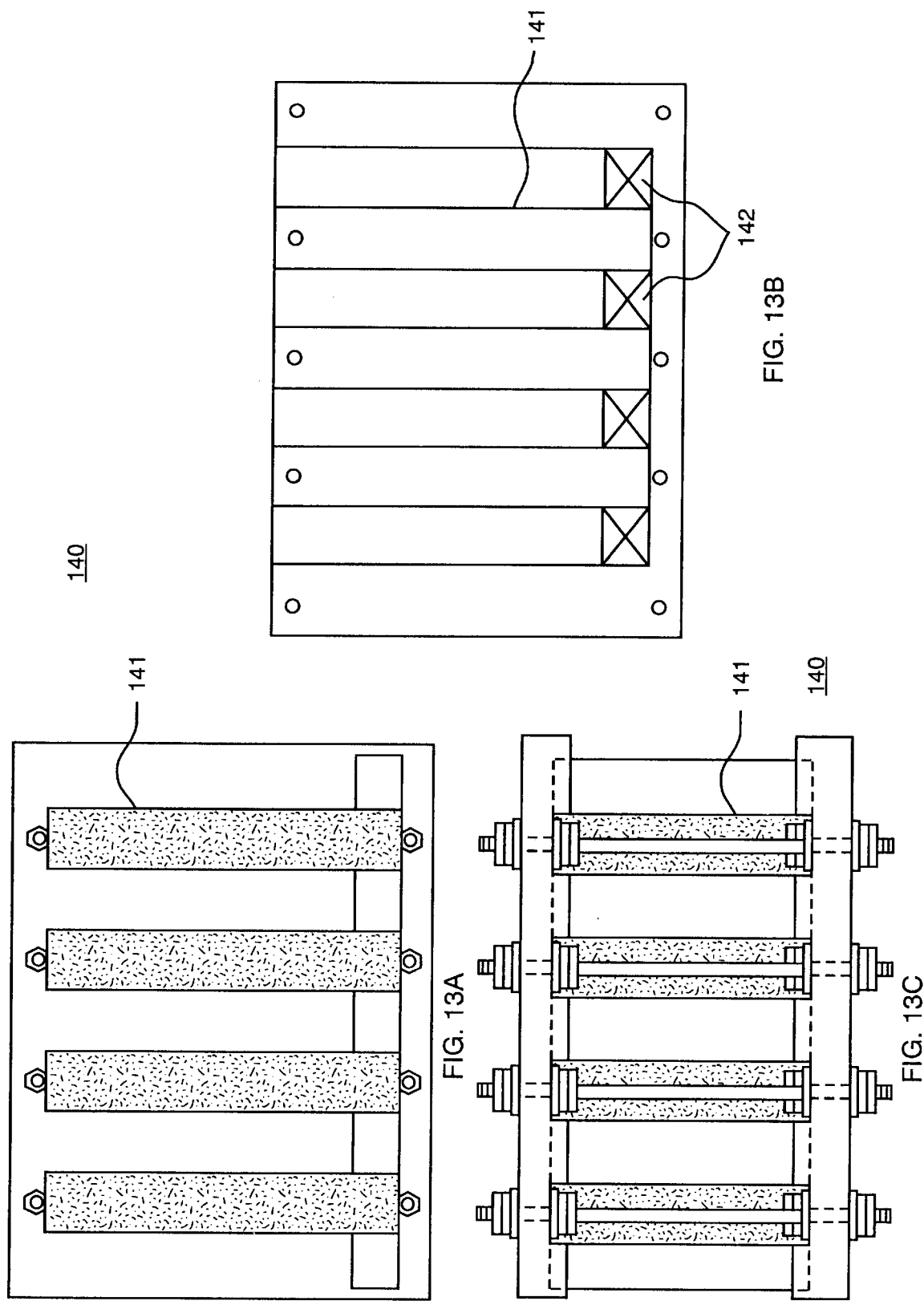

DRYING APPARATUS FOR COFFEE BEANS AND SIMILAR CROPS

This application claims benefit to Provisional application 60/043,364 filing date Apr. 2, 1997.

BACKGROUND OF THE INVENTION

1. Technical Field of the Invention

This invention most generally relates to methods and apparatus for drying coffee beans and other green crops or coarse granular bulk materials composed of beans, seeds, pods, or grains of relatively large and uniform size, to reduce the moisture content. Most particularly, it relates to convective airflow drying systems, especially solar powered system, and removable, internally ventilated containers for handling the bulk materials being dried.

2. Background

The art of harvesting and processing coffee beans from tree-borne cherries to the green coffee bean of commerce consists of two principle methods, the "dry" method and the "wet" method. Either method must result in moisture content equivalent to one third or more of the bean's weight being removed, to produce a commercial product.

The dry method is the more ancient and rudimentary. The cherries are hand-picked all in one picking, washed, and sun-dried on drying ground or concrete slabs in thin layers, usually for a period of two to three weeks. The beans ferment during the process, and are turned several times a day to promote even drying. They are covered at night to protect them from moisture.

In the wet method, only the ripe cherries are picked in any one picking of a tree. It may take three to five sequential pickings in a season over the time it takes between the earliest and the latest cherries to ripen. After the cherries are washed, the outside fruit pulp is removed by machines and the berries are then placed into large concrete tanks to ferment for twelve to twenty-four hours, then poured into concrete sluiceways or washing machines to be thoroughly washed in constantly running water. Then they are dried in much the same way as in the dry method, except that the drying time is shorter. These beans are then processed through hulling machines to remove the remaining layers of skin.

Problems with either method of this art include the inefficient, labor-intensive and lengthy sun-drying time of beans on concrete slabs or the use of other manual, passive solar methods and devices. There are many patents that describe related technologies and devices. Various fuel-fired dryer systems have been used to try to accelerate the drying time and prevent the mold problems. These alternatives add expense and complexity to an otherwise simple process. Failing to safeguard the beans from excess moisture, in particular the formation of mold during the drying process is crucial as the value of the crop drops dramatically if mold occurs. Overdrying can also occur using accelerated methods; this also affects the quality and value of the crop.

The requirements for loading and unloading the crop into and out of small, stand alone, solar dryer systems is burdensome. The passive solar drying time is always too long; leaving the crop exposed to potential downturns in weather conditions.

SUMMARY OF THE INVENTION

The invention in it's simplest form is a solar powered dryer system for coarse granular bulk materials such as whole coffee beans, coca beans, and various grains, where a substantial degree of moisture must be removed from the bean, seed, pod or individual grains, as part of the processing of the material to make it useful. The cycle of loading and unloading of the bulk materials into and out of multiple small solar dryer systems can be accomodated by use of removable containers, and the efficiency of the systems is improved if the airflow is directed through the container and the bulk materials it holds. The invention is adaptable to utilize both convective solar heated airflow and direct solar radiation of the subject materials.

The principle functional components of a dryer system of the invention are an airflow generator, a removable, ventilated container for the materials, a means for receiving and supporting the removable container within the dryer system in such a way as to constrain air flow to flowing through the container.

It is characteristic of passive solar dryers that airflow is more limited than heat, by the relatively low differential pressure that can be generated in low cost, pratical solar dryers, and that it takes many hours or days to affect a significant reduction in moisture levels in the passive solar drying of most crops. The relative amount of dry airflow in low airflow dryer systems has been demonstrated to be the more significant factor to its utility and efficiency. It is therefore important to configure the dryer for maximum differential pressure, and maximum exposure of the materials to the dry air flow, while retaining a low cost structure and a simple bulk container handling system.

The removable container aspect of the invention has an open top and ventilated bottom and/or sidewall surface and is configured with air permeable airflow interior wall sections dividing the material into relatively thin vertical layers, or with columnar structures defining vertical air passageways with air permeable walls being distributed throughout the materials being dried. The container, when installed, divides the dryer plenum into upper and lower chambers. The relatively dry, outside air is heated and pushed by a convective generator into the dryer's lower chamber, spreads over the bottom of the container and rises through the air passages in the container, leaching out the excess moisture in the materials and carrying it to the upper region of the plenum, where it is then exhausted.

It is an object of the invention to have a convective airflow dryer system with a materials container for drying coffee beans and other such crops and materials, with interior airways extending through the container through which the convective airflow of the system can be directed, where the airway walls are gas permeable and will freely admit, flow and transfer air, including moisture ladened air from the coffee beans or other material being dried, into the airways and out of the container, and where the container is easy to fill, insert, remove, empty, refill and reuse.

It is another object of the invention to provide such a container and system where the container is mounted on wheels or rails, to faciliate the engagement and disengagement of the container with the stationary part of the dryer system.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

BRIEF DESCRIPTION OF THE DRAWINGS

FIG. 9A is a top view of an alternate wire grid airflow partitioning system for a container.

FIG. 9B is a cross section side view of the system of FIG. 9A.

FIG. 9C is a side view of a section of the system of FIG. 9A.

FIG. 11A is a top view of partition elements configured to grip tubing carrying hot water or other fluid, which functions as a heat exchanger.

FIG. 11B is a top view of a partition element configured with an internal fluid cavity and functioning as a heat exchanger.

FIG. 11C is a top view diagram of the cavity of FIG. 11B, showing inlet and outlet fluid ports.

FIG. 13A is a top view of a fiber mesh or membrane airflow partitioning system for a container.

FIG. 13B is a cross section of the system of FIG. 13A.

FIG. 13C is a bottom view cross section of the system of FIG. 13A.

DESCRIPTION OF THE PREFERRED EMBODIMENT

Figure 1:
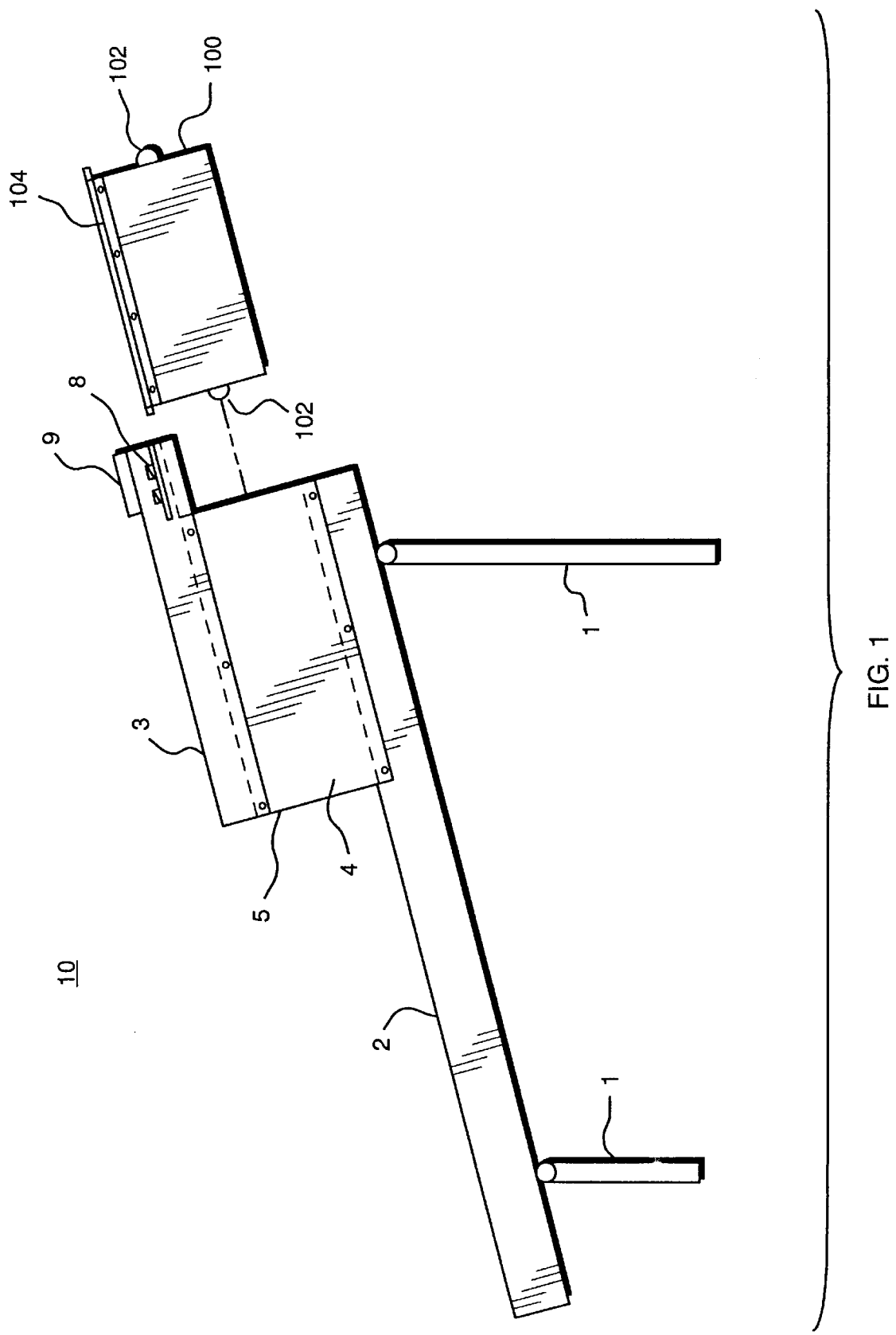
FIG. 1 is a side view of the preferred embodiment of the invention, showing the rack, solar powered convective generator, container housing, container and transparent top assembly.

The invention is susceptable of many variations. A preferred embodiment of the invention is a removable materials container for use in a convective airflow materials drying system such as one with a solar heated convective generator or collector that is a duct with an opening at or near each end, arranged at a suitable incline, or otherwise having a means for causing air flow between the inlet and outlet, and painted black or otherwise treated on it's upper surface to absorb a relatively high amount of available solar radiation. The duct is supported at the correct incline or angle by a base or rack, and directionally oriented to receive a large degree of the available sunshine each day. The solar radiation heats the upper surface of the duct, causing the air within the duct to be heated. The flue effect of the inclined duct causes the hot air to be continuously convected out the upper opening or outlet and makeup air to be drawn into the lower opening or inlet. The lower or bottom surface may be insulated to retain more heat in the air flow.

The structure for receiving and supporting the removable container is arranged above the upper opening or outlet of the convective generator, so that when the container is inserted into it's place in the dryer, it is supported over the source of heated air. The structure may be sidewalls forming a housing with interior supports or sliderails that will engage with corresponding rails on the sides of the container, and where the housing is attached to the upper end of the convective generator.

The removable container has an open top and ventilated bottom surface. It is configured with vented or screened walls or dividers that constrain the inflow and packing of the coarse grains of material to be dried around relatively thin vertical sections or columns of passageways connecting the ventilated bottom to the open top, and distributed uniformally throughout the volume of the container. With the container in place in the dryer, the hot air rising from the convective generator spreads over the bottom of the container and rises through the air passages in the container to be vented from the top of the dryer. The vented dividers in the container provide a generous surface area. for airflow immediately adjacent to the materials being dried, so that moisture in the materials permeates readily into the airflow, thus heating and drying the materials within.

The solar dryer is generally stationary, but the container is readily removed and replaced by manual means to facilitate loading and handling of the materials and for storage at night or during inclement weather.

The transparent top assembly of the various preferred embodiments provides a rain-proof enclosure with a window on the top of the container. The top assembly is configured to collect and route the convective air flow rising through the air passages in the container, out of a rain-protected opening. Direct solar radiation through the window onto the surface of the materials and the container provides additional heat to the materials and to the convective air flow, increasing the overall efficiency and speed of the drying process.

Figure 2:
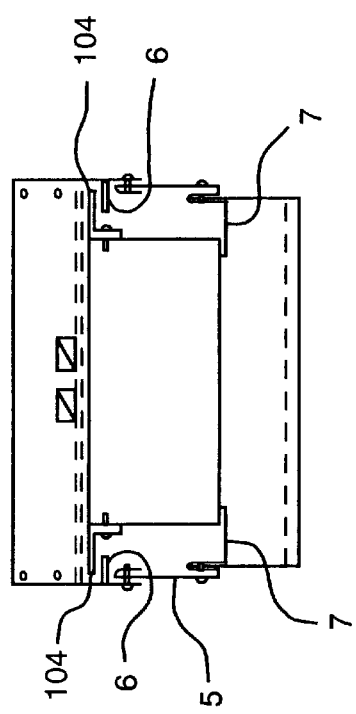
FIG. 2 is an open end view of the dryer of FIG. 1, showing the container of FIG. 1 in place.

Referring to FIGS. 1–2, there is illustrated a dryer system 10 with a removable, vertical air flow materials container 100. FIG. 1 shows a rack assembly 1 made of pipe material secured to the ground or a base of some sort, to which the passive solar collector/convective generator 2 is attached. The top assembly solar collector 3, consisting of a frame with a translucent top surface, and sidewalls 4 form plenum 5. The top assembly is equipped with a circulation fan 8 powered by solar cell 9, which boosts the convective air flow through the dryer system. Container 100 is manually insertable through an opening in the upper end of plenum 5, by the use of handles 102. FIG. 2 shows the end view cross section of container 100 installed in plenum 5.

Container 100 is configured with interior airways connecting openings in the bottom surface to openings in the top surface, as will be further explained in the later figures. The interior sidewalls of plenum 5 are configured with sidebars 6 and with side skirts 7. Container 100 is supported by its external sidewall sliders 104, bearing on plenum sidebars 6. The bottom surface of container 100 contacts side skirts 7. This contact serves to divide the plenum into upper and lower chambers, and to constrain the vertical air flow to flowing from the lower chamber through the internal airways in the container into the upper chamber.

Figure 3:
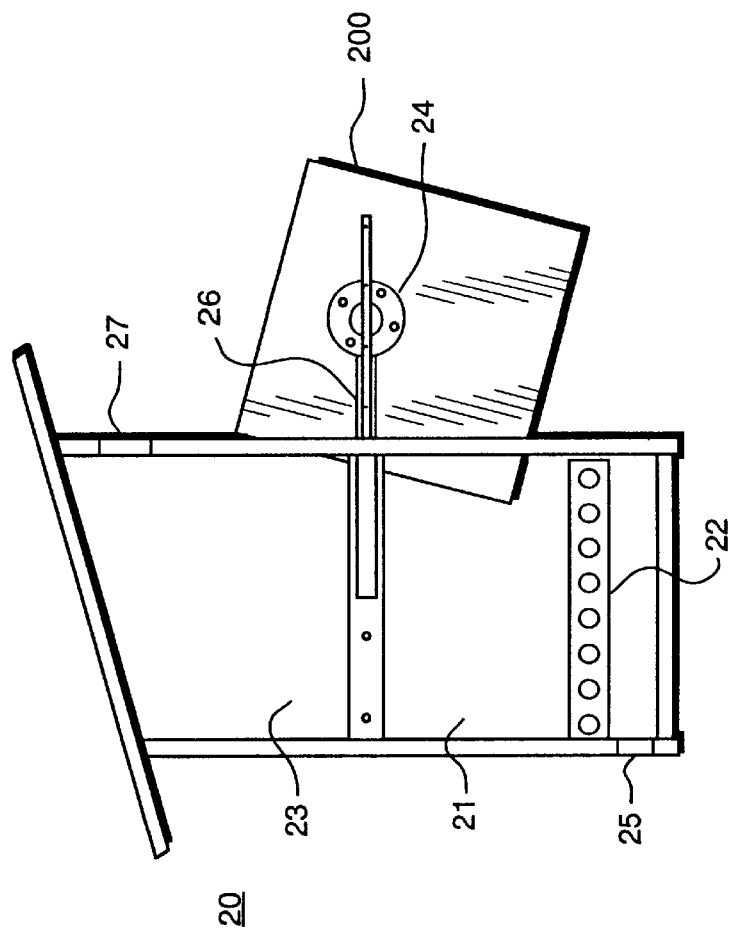
FIG. 3 is a side view cross section of a tower version of the invention, showing a heat exchanger in the lower tower plenum, and a removable container extended out of the tower on sliding rails and tilted for ease of filling.

Referring to FIG. 3, a solar tower dryer system 20 has a vertically oriented housing defining a large plenum, with lower air inlet 25 and upper exhaust outlet 27. Heat exchanger 22 transfers heat from another source to the plenum to enhance the solar powered convective airflow. Removable container 200 is shown with tilt mechanism 24, mounted on rail system 26 for easy access, in the extended or out position. Container 200, when in the closed position, partitions the plenum into lower and upper chambers 21 and 23, constraining convective air flow to flowing through the container in the manner of the invention.

Figure 4:
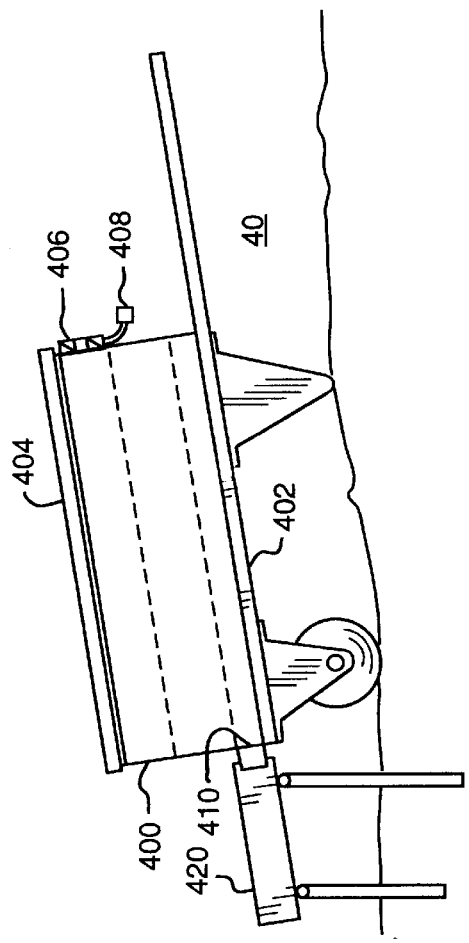
FIG. 4 is a variant of the dryer of FIG. 1, where the container housing, top assembly and container have been integrated into a wheel barrow configuration which is rolled into engagement with the convective generator or solar heat panel.
Figure 5:
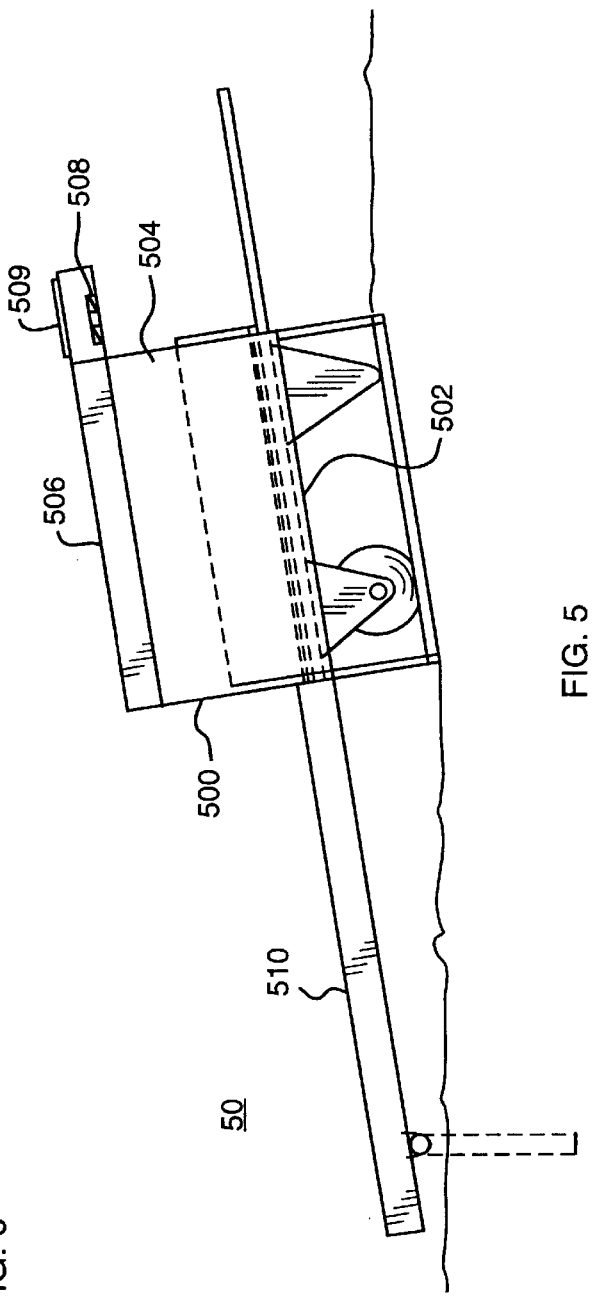
FIG. 5 is a side view of the dryer of FIG. 1, the container housing adapted to accept a wheel barrow version of the removable container in a roll-in fashion.
Figure 6:
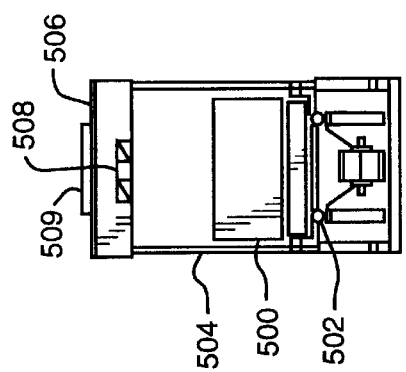
FIG. 6 is an end view of the dryer of FIG. 5.

Further variations of the preferred embodiment are shown in FIGS. 4, 5 and 6, where bulk material containers of the invention are mounted to a wheel barrow-like frame for mobility, and configured to mate with compatible solar drying systems. FIG. 4 shows dryer system 40 with container 400 mounted on wheel barrow frame 402, with a removable glazing 404, electric fan 406 and power cord 408, for connecting to a solar electric panel or other power source. The sidewalls of container 400 extend above and below the region of bulk material containment, forming upper and lower plenum chambers analogous to the upper and lower chambers 23 and 21 of tower dryer 20 of FIG. 3. The lower chamber of container 400 has an airflow port 410 that is connectable to a matching port on convective solar heat panel 420, to provide additional convective air pressure through the container when the container is loaded and parked in its drying spot.

FIGS. 5 and 6 show drying system 50, with container 500 which has a lower chamber below the bulk material region with an opening through the front wall of the container, and is mounted on wheel barrow-frame 502. A plenum structure 504 is configured with a top surface glazing 506, exhaust fan 508 and solar panel 509 to power fan 508. The structure is connected by an opening in its front wall to convective solar panel 510. The wheeled container 500 is rolled all the way into the plenum structure so that the respective front wall openings are abutted and the lower chamber is connected for air flow to the solar panel 510. The back wall of the container effectively closes that end of the plenum. The resulting air flow is from solar panel 510 into container 500, through the bulk materials, and into the upper area of plenum 504 to be exhausted by fan 508, similar to the previously described embodiments.

To those skilled in the art, the invention admits of many other variations. This will be evident in the following descriptions of preferred embodiments for the container and for elements of the container, but these in no way limit the scope of the invention.

Referring now to FIGS. 7–13, various embodiments of the internal structure of containers of the invention are illustrated. The common characteristic is that the internal structure, in whatever form it takes, provides for a lower total density of the course grains of bulk materials than normal open containers by reserving space for gas permeable or open walled or vented air passageways that are uniformally distributed throughout the volume of the container. The passageways generally connect openings in the bottom surface of the container to an open top or vented top surface, allowing for vertical airflow under very low pressure differentials such as are common with passive solar heating systems. Although side wall openings with cross flow and vertical airflow combinations or forced cross flow horizontal passageways are within the scope of the invention, substantially vertical air flow passageways are preferred.

The structure of the region defining the passageways is susceptible to many variations. Mainly it must be strong enough to constrain the bulk materials from crushing or clogging the airways, and of sufficient open weave or porosity or screen-like character to transfer moisture or water vapor or moisture ladened air from the bulk material to the airflow, while still of uniformally small enough or close enough weave or structural spacing to prevent average size grains from entering and clogging the airflow passageways. Further advantages lie in constructing the passageways to be mainly vertical, for unassisted thermal convective airflow and self clearing of smaller articles of of the bulk materials that penetrate the weave. Additional advantages lie in configuring these internal airflow passageways to allow for easy pouring and distribution of bulk materials into the container, and further ease of emptying the container when the moisture content is reduced to the desired level.

Figure 7A:
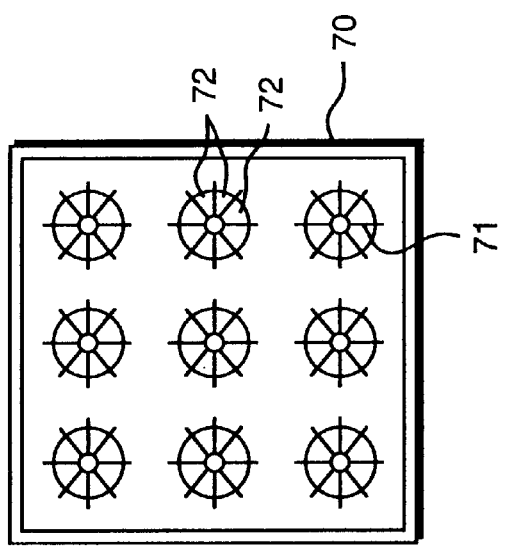
FIG. 7A is a top view of a collimated internal airflow system for a container.
Figure 7B:
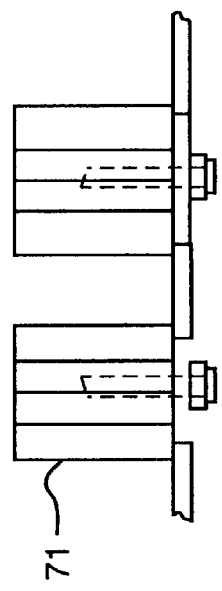
FIG. 7B is a partial side view of the base of a column of the system of FIG. 7A, showing the attach bracket that permits airflow to the base of the column.

FIGS. 7A and 7B show an extruded vertical column structure 71 with a star shaped cross section, the base of which is attached to the bottom of container 70. The columns are arranged in a uniform pattern over the bottom of the container, assuring even distribution of airflow throughout the materials. The vanes of the column structure are sufficiently close together to exclude the beans or coarse particles of bulk material from filling the core space or region of the column, thus maintaining vertical passageways 72 for airflow. The bottom of container 70 is vented in the region immediately adjacent to the base attachment where the bulk material cannot penetrate, so that air can enter and flow into the vertical passageways. The tops of the columns 71 may be unsupported, or supported by an open gridwork of cross members.

Figure 8B:
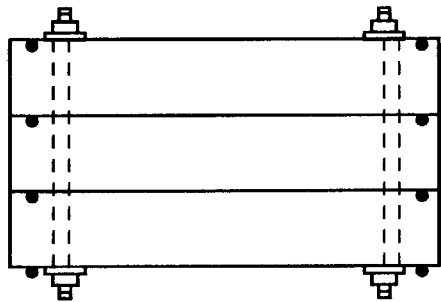
FIG. 8B is a diagrammatic side view of the system of FIG. 8A, showing the partition spacers bolted together.
Figure 8C:
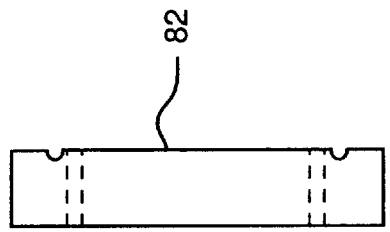
FIG. 8C is a side view of a spacer of the system of FIGS. 8A and B.
Figure 8A:
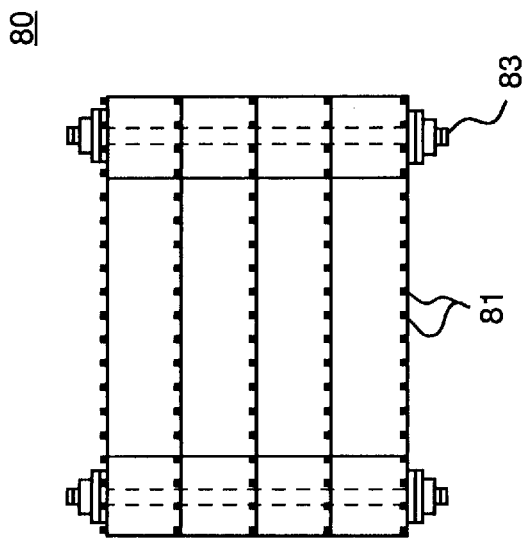
FIG. 8A is a top view of a wire grid partitioning airflow system for a container.

FIGS. 8A, B and C illustrate a container system 80 with open weave cross wire wall sections 81, separated by spacers 82, ganged together with cross bolts 83 to form parallel bays. The bottom of the container is screened to allow maximum airflow. The size and spacing of the wire weave of wall sections 81 is large enough and close enough compared to the bean or average particle size of the crop being dried, that a continuous vertical layer of airspace is maintained through the weave pattern of the wire wall section, extending from side to side and bottom to top. The series of wire walls provides a lattice work of air passages extending throughout the volume of the container.

Referring to FIGS. 9A, B and C, there is illustrated a three layer wire wall section 91, configured with spacers 92 and cross bolts 93 to form parallel bays which collectively define a container system 90, similar to container system 80. The wire wall section 91 consists of a central layer of vertically disposed wires or tubes 94 of larger diameter spaced equally across the section. The vertical layer is sandwiched between horizontally disposed smaller diameter parallel wires 95 which act as the screen to constrain the bulk material to the bays, and allow vertical airflow through the middle of the wall section.

Figure 10D:
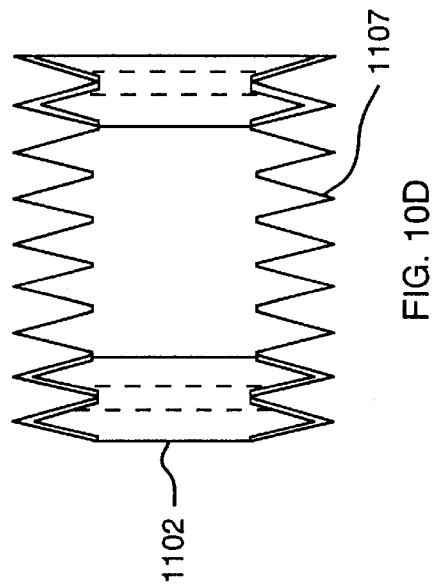
FIG. 10D is a diagramatic top view of an airflow partition configured with an accordian-like V fold for airflow passages.
Figure 10C:
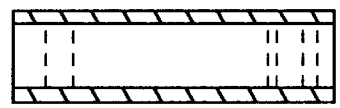
FIG. 10C is a side view of a spacer of FIG. 10C.
Figure 10A:
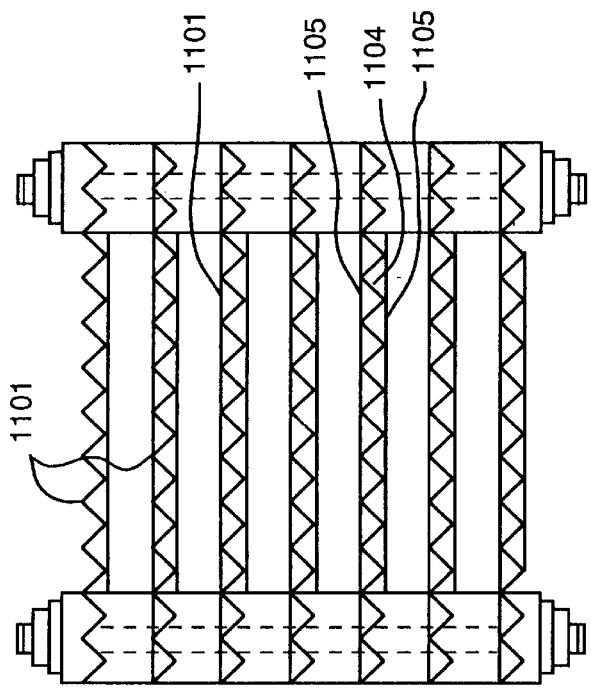
FIG. 10A is a top view of an airflow partitioning system with a corrugated or V fold center layer.
Figure 10B:
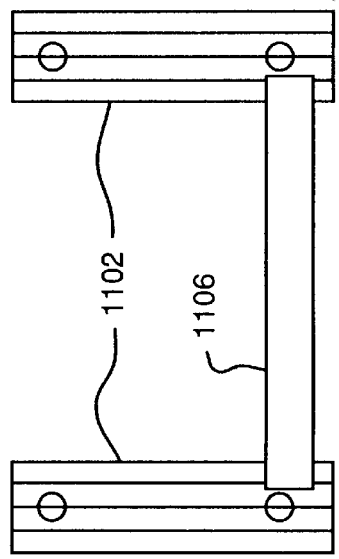
FIG. 10B is a cross section end view of the system of FIG. 10A, showing the face of the spacers and the bottom section of the system.

Referring to FIGS. 10A, B, and C, there is illustrated a corrigated wall section 1101, configured with spacers 1102 and cross bolts 1103 to form container system 1100, similar to system 90. Bottom surface 106 is ventilated at least in the region where wall section 1101 intersects, to permit airflow from underneath the container into the wall section. Wall section 1101 consists of a center layer 1104 with vertical corrugations, sandwiched by screens or perforated sheets 1105 having sufficiently fine openings to contain the bulk materials within their respective bays, allowing vertical airflow from bottom to top within the corrugated wall sections throughout the container.

An alternative corrugated wall section pattern 1107 is shown in the top view, FIG. 10D, where the corrugations are sharply formed and closely spaced so that the bulk material is unable to pour fully into the folds or corrugations; permitting the requisite vertical airflow to occurr in the wall section.

Referring now to FIG. 11A, wall section 111 has ribs 112 sized and spaced to provide adjacent air channels, and is further configured with press fit tubing grips 113 to grip tubing, arranged to secure a length of tubing pass back and forth through its core. The tubing carries liquid coming from a heat source. The wall section acts as a heat exchanger, heating the materials in the container and generally enhancing the drying process. FIG. 11B shows a wall section 121 with ribs 122 and a central reservoir 123, through which the heated liquid passes, rather than the tubing of FIG. 11A. FIG. 11C shows a face view of reservoir 123, with side mounted inlet 124 and outlet 125 for circulation the heating liquid.

Figure 12D:
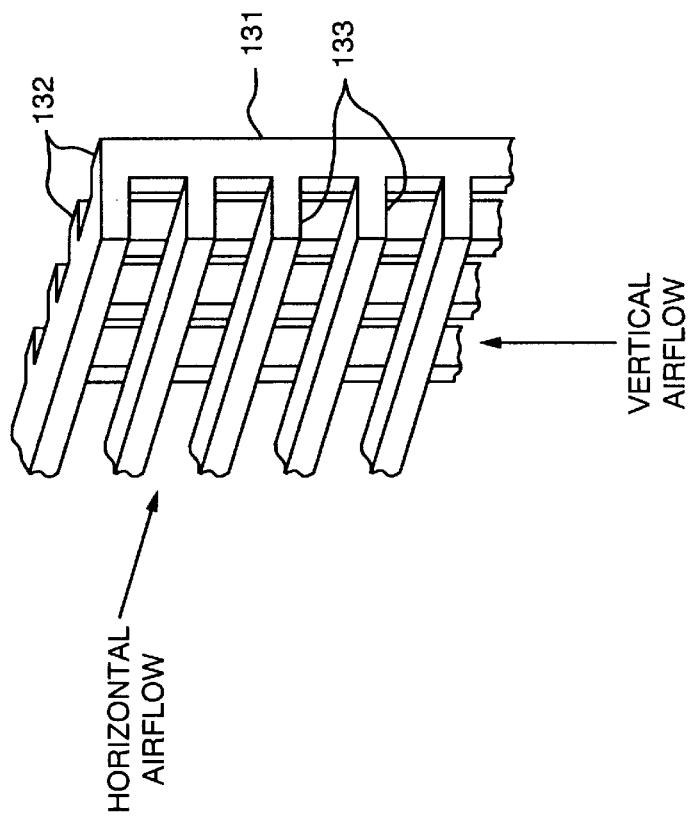
FIG. 12D is a perspective partial view of the two layer grid of FIG. 12A, showing the open gridwork for crossflow of air throughout the grid, connecting horizontal and vertical channels.
Figure 12A:
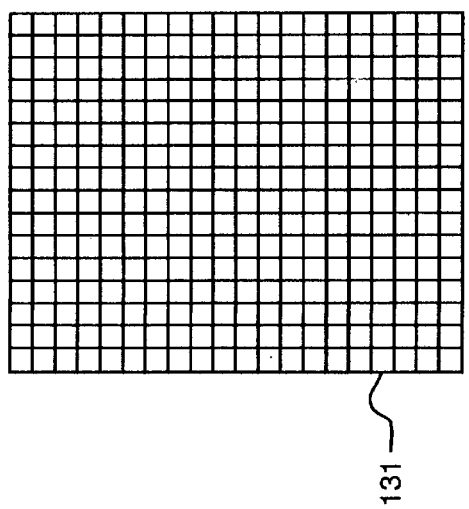
FIG. 12A is a front view of another airflow partition configured as a two layer grid system of parallel slats.
Figure 12C:
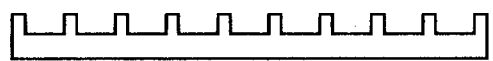
FIG. 12C is a side view of the grid of FIG. 12A, showing horizontal channels.
Figure 12B:
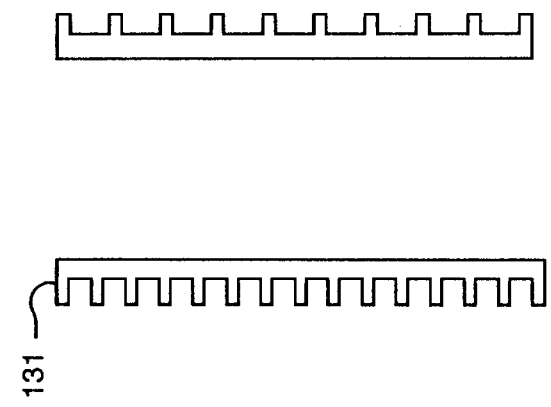
FIG. 12B is a top view of the grid of FIG. 12A, showing vertical channels.

Referring to FIGS. 12A, B, C, and D, an open lattice wall section 131 is shown, where one side has slats 132 arranged vertically and the other side has slats 133 arranged horizontally, the slats being attached in a common plane. The size and spacing of the slats is selected to prevent average sized coffee beans or grains of other bulk material being dried from entering in between the slats, and provides a corresponding network of airflow passages from bottom and sides to the top. The grid can be made by extruding the cross section of FIGS. 12B or 12C, with parallel channels about one half in depth of the total thickness of the partition; and then sawing or otherwise creating the perpendicular set of parallel channels on the reverse side, again with a depth of about one half of the total thickness of the partition, resulting in the open gridwork illustrated in perspective view FIG. 12D.

Referring to FIGS. 13A, B and C, container system 140 includes interior wall sections 141, divided by spacers 142, and made of a very low density, gas permeable fiber array 143, which provides the passageway for airflow from the bottom of the container to the top. The fiber membrane screen may be of various materials and constructs, as for example, the materials commonly found in a furnace air filter. The container is assembled in generally the same manner and works as previously described embodiments.

In use, solar dryers of the invention will be located so as to take advantage of the prevailing sunshine. The containers will be sized and configured to accommodate a handy portion or volume of coffee beans or other materials to be dried. The containers may be collected and filled at a central filling station, and transported and slid into respective solar dryers for the day. Alternatively, the beans or other material may be transported by vehicle from dryer to dryer, to fill each respective container. In the evening, or in the event of a pending storm or period of extended cloudiness and/or dampness, the containers can be readily removed and transported to a protected site or building.

Keeping the beans in the well-ventilated containers overnight will decrease the common problem of mold growing during nightly storage of the beans. The next morning, or when the weather otherwise dictates, the removable containers can be re-installed in the dryers for another day of drying, or until a sufficient amount of moisture is removed. Simple weighing of the containers will indicate roughly the degree of drying that has transpired.

It is anticipated that the solar powered variation of the invention will be especially suited to regions where manual labor, inexpensive materials and simple fabrication techniques are preferred over expensive, high tech designs and manufacturing methods.

While the heat generated in a simple solar collector is adequate for the drying task, the minimal head pressure of a relatively short convective generator combined with the resistance of the honeycomb array of airflow channels through the container results in a less than ideal volume of air flow for rapid drying. Any boost to the natural circulation of the heated air is found to improve the performance of the dryer. The convective air flow is boosted or enhanced by the addition of circulation fans at various places on the dryer, including in the convective generator section, in the lower plenum, with an auxiliary hot air source, or in the upper plenum or top assembly. The fan or fans are solar powered for simplicity.

A tall chimney or exhaust flue off the upper plenum likewise increases the effective head pressure by "sucking" hot air through the dryer in the same fashion as a chimney. The chimney's effect is enhanced by having it insulated to retain heat and/or painted black to absorb additional heat.

Auxiliary heat, supplied by heaters, heat exchangers, or the injection of supplemental hot air, can also be added anywhere to the air flow path upstream of the container. Sensors may be added to monitor temperature and/or humidity; indicators may be provided locally or remotely. A local or remote, automated or programmable control means may be added for better control and/or recording of the process. Pressure sensors can be utilized to monitor the weight of the container to calculate the progress and amount of moisture reduction.

The design configuration of the container interior can be of scaled and varied as required for drying various crops or other materials, always incorporating appropriate vertical airway partitioning elements finely distributed throughout the container. The drying effect begins at the bottom of the container, and progresses fairly uniformly over time, up through the depth of the subject materials. The volume and depth of the container module design can be optimized for the subject materials, the drying capacity of the particular dryer design, and the length of the average day.

The bottom of the container can be configured with a releasable retainer assembly that is ventilated as necessary to permit air to flow while closing off the channels or zones which hold the granular material being dried, but which can be easily opened to dump or empty the container without the need to turn it over. The design configuration of the container size or volume, and the other principle components of the dryer may be likewise scaled or varied to utilize readily available component materials or to meet particular requirements of the crop or matter being dried, all within the scope of the invention.

As will be realized, the invention is capable of other and different embodiments, and its several details are capable of modifications in various respects, all without departing from the invention. For example, the invention is a removable materials container for drying coffee beans and other crops in a convective airflow dryer system, with a continuous bottom and sidewall surface configured so as to define a suitable interior volume for the purpose.

There is at least one interior airway structure extending from the bottom or sidewall surface to about the top of the container, that is configured to freely admit, flow and transfer air, including moisture ladened air, through a port or vent in the bottom or sidewall surface and over its length and breadth into and out of the coffee beans or other crops for which it is being used. The container is also configued for being manuall inserted into the airflow of the dryer system and to be easily removed from the dryer for emptying and refilling.

As another example, the container of the invention can include several vertically oriented, parallel planar structures spanning the width of the container and dividing the interior volume into a plurality of bays. Alternatively, the airway structure may be one or more elongate extrusions of star-like cross section where the vanes of the extrusion are closely spaced so as to resist penetration by average size articles or beans of the coffee beans and other crops, with one end of the extrusion secured to the bottom or sidewall surface, and the other end projecting upward and terminating at about the top of the container.

As yet another example, the airway structure may be a latticework of elongate members sized, spaced and oriented to prohibit the intrusion of average size articles or coffee beans or other crops that may be being dried, into the region of the airway structure. The latticework may be a coarse wire grid or a woven wire screen. It may be a multi-layer lattice work of alternating layers of vertical and horizontal parallel elongate members, where the members are sized, spaced and oriented to prohibit the intrusion of average size articles or coffee beans or other crop into the region of the airway structure where it might obstruct airflow.

As still yet another example, the airway structure may be a corrugated sheet of sharply creased alternating folds, where the folds are sized, spaced and oriented to prohibit the intrusion of be seriously obstructed. The airway structure may be a multi-layered structure with a middle layer consisting of a corrugated sheet with corrugations oriented vertically, and external layers consisting of a screen material of sufficiently small weave to prohibit the intrusion of average size articles or beans into the region of the corrugations. The airway may also be a gas permeable fiber blanket or thick, gas permeable partition.

As yet still another example, the containers of the invention may be configured to be stackable for handling and storage out of the dryer system, and stackable or otherwise interconnectable when used within the dryer system. When used in a stackable configuration, the airway openings are aligned and interconnected so that all airflow is continuously directed into the first container, up through the stack of containers, and out the last or top container. In some applications, where there is sufficient pressure available, airflow may be directed through differently located airflow ports downward, sideways or in pathways other than upward. Also, it should be clearly evident from the description and drawings, that the container or adjoined containers may in and of themselves, form the main airflow channel, needing only an airflow source or connecting port or plenum, and an exhaust port, somewhere on the container or on the stack of interconnected containers.

As even still yet another example the airway structure might further incorporate the tubing necessary for conducting a fluid being used as a heat exchange medium. As an additional example the removable container may be configured with at least one supporting wheel, as in a wheel barrow configuration. Two or more wheels are equally within the scope of the invention.

As a yet additional example, the invention is a convective airflow dryer system for drying coffee beans or other crops, in combination with a removable materials container with any or all of the attributes described above. The dryer system may incorporate a solar powered heat and convective airflow generator, and the removable container may be configured with one or more supporting wheels.

I claim:

1. A materials container for drying coffee beans and similar crops in a convective airflow dryer system, comprising:

a continuous bottom and sidewall surface configured so as to define an interior volume suitable for containing said coffee beans and other crops, at least one inlet port, at least one exhaust port, and an airway structure oriented within said container so as to define a uniformly distributed network of convective airways when said container is filled with said beans and similar crops, said container configured to admit air in through said inlet port into said network and out of said network through said exhaust port.

2. The container of claim 1, said airway structure comprising a plurality of vertically oriented, parallel planar structures spanning the width of said container and dividing said interior volume into a plurality of bays.

3. The container of claim 2, each said planar structure comprising a latticework of elongate members sized, spaced and oriented so as to resist penetration into the space between said members of average size articles of said coffee beans and similar crops.

4. The container of claim 3, said latticework comprising at least two layers of respectively vertical and horizontal parallel elongate members, said members sized, spaced and oriented to prohibit the intrusion of average size articles of said coffee beans and similar crops into the space between said members.

5. The container of claim 2, each said planar structure comprising a multi-layered structure with a middle layer consisting of a corrugated sheet, and external layers consisting of a screen material of sufficiently small weave to prohibit the intrusion of average size articles of said coffee beans and similar crops into the region of said corrugations.

6. The container of claim 2, each said planar structure comprising an air permeable fibrous layer.

7. The container of claim 2, said bottom and sidewall surface comprising a plurality of spacers interspersed with edges of said planar structures and secured therewith into an integral assembly.

8. The container of claim 2, each said planar structure comprising a wall section, each face of said wall section configured with a parallel pattern of raised ribs, said pattern being sized, spaced and oriented to prohibit the intrusion of average size articles of said coffee beans and similar crops into the space between said ribs.

9. The container of claim 8, each said wall section comprising a corrugated sheet.

10. The container of claim 2, further comprising a releasable retainer assembly on the underside of said container for emptying said beans and similar crops when dry.

11. The container of claim 1, said airway structure comprising a multiplicity of uniformly distributed and vertically oriented elongate extrusions of star-like cross section wherein vanes of said extrusion are closely spaced so as to resist penetration into the space between said vanes by average size articles of said coffee beans and similar crops.

12. The container of claim 1, said airway structure further comprising at least one tube for conducting a fluid heat exchange medium through said container, said tube having inlet and outlet connections at said bottom and sidewall surface.

13. A method for drying coffee beans or similar crops comprising the steps of placing said beans and similar crops into a container, said container comprising a continuous bottom and sidewall surface configured so as to define an interior volume suitable for containing said coffee beans and other crops, at least one inlet port, at least one exhaust port, and an airway structure oriented within said container so as to define a uniformly distributed network of convective airways when said container is filled with said beans or similar crops, said container configured to admit said airflow in through said inlet port into said network and out of said network through said exhaust port, generating a heated airflow, and directing said airflow into said inlet port through said container and out said exhaust port.

14. The method of claim 13, said generating a heated airflow comprising the use of a solar powered convective airflow generator and a solar powered exhaust fan.

15. A convective airflow dryer system for drying coffee beans and similar crops comprising means for generating a heated airflow, a container for holding said coffee beans and similar crops during said drying, said container comprising a continuous bottom and sidewall surface configured so as to define an interior volume suitable for containing said coffee beans and other crops, at least one inlet port, at least one exhaust port, and an airway structure oriented within said container so as to define a uniformly distributed network of convective airways when said container is filled with said beans and similar crops, said container configured to admit said airflow in through said inlet port into said network and out of said network through said exhaust port.

16. The dryer system of claim 15, further comprising a releasable retainer assembly on the underside of said container for emptying said beans and similar crops when dry.

17. The dryer system of claim 15, further comprising means for removably inserting said container into said airflow.

18. The dryer system of claim 15, comprising at least one supporting wheel for transport.

19. The dryer system of claim 15, said airway structure comprising a plurality of vertically oriented, parallel planar structures spanning the width of said container and dividing said interior volume into a plurality of bays, said planar structures comprising a wall section, each face of said wall section configured with a parallel pattern of raised ribs, said pattern being sized, spaced and oriented to prohibit the intrusion of average size articles of said coffee beans and similar crops into the space between said ribs.

20. The container of claim 19, each said wall section comprising a corrugated sheet.

* * * * *